Nov. 13, 1956  M. H. RIPPLE  2,770,138
KITCHEN APPLIANCE
Filed July 22, 1954  3 Sheets-Sheet 2

United States Patent Office 2,770,138
Patented Nov. 13, 1956

2,770,138

KITCHEN APPLIANCE

Melvin H. Ripple, Canton, Ohio, assignor to The Hoover Company, North Canton, Ohio, a corporation of Ohio Application July 22, 1954, Serial No. 445,137

8 Claims. (Cl. 74—16)

The present invention relates to a domestic kitchen device and more particularly to a plurality of appliances connectible to an electric motor.

An object of the invention is to provide a device having a plurality of kitchen appliances such as a food mixer, can opener, meat grinder, blender or other kitchen aids all mounted on a turntable which is rotated to position each appliance for connection with an electric motor. Another object is to provide a device having a plurality of kitchen appliances, each separately connectible to an electric motor, and means to automatically select the optimum speed for each appliance. Other objects and advantages of the invention will become apparent from the following description and drawings wherein.

Figure 1:
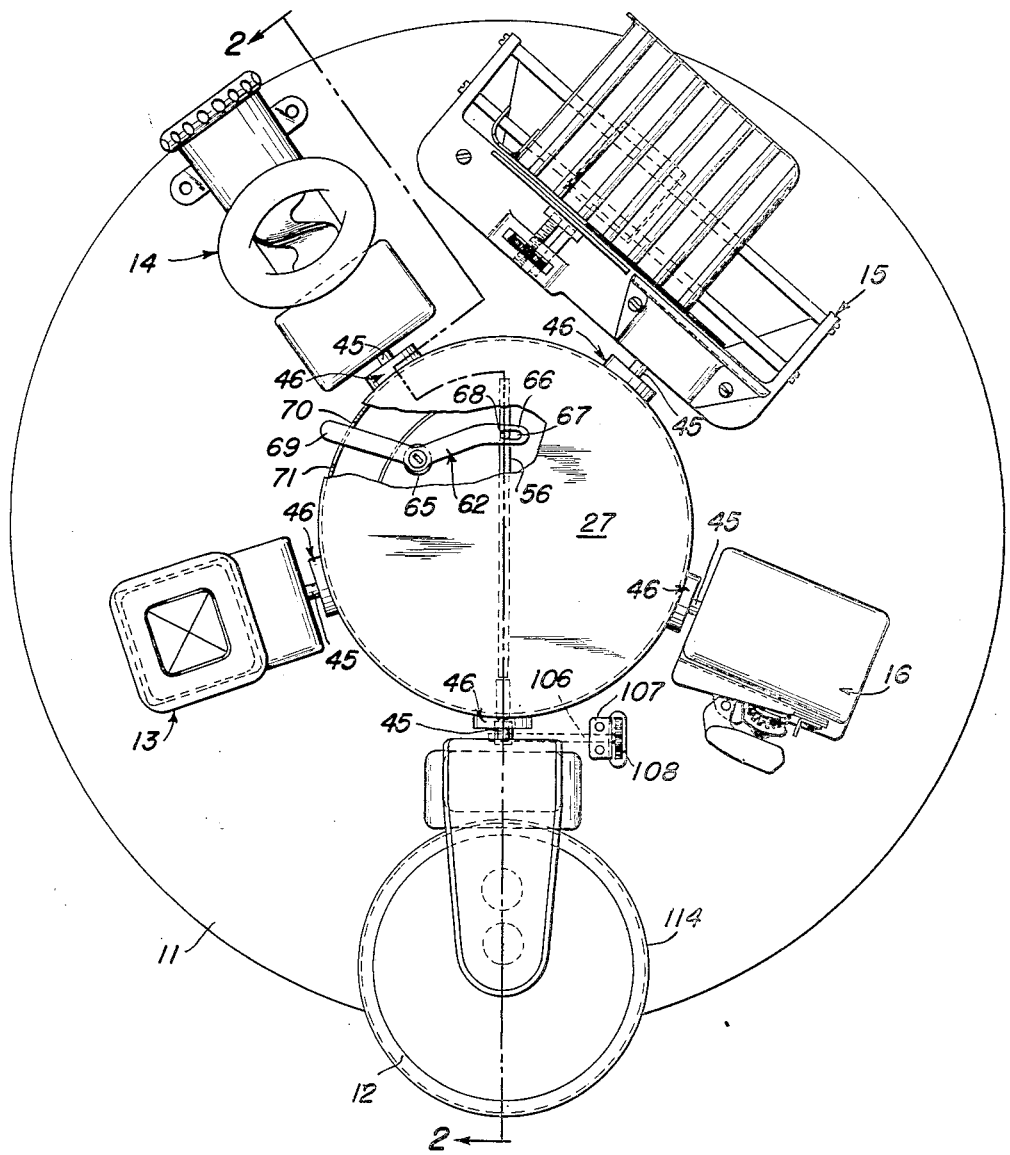
Fig. 1 is a top plan view of the device.

The embodiment of the invention herein disclosed comprises a circular base 10 on which is rotatably mounted an annular support or turntable 11 supporting five kitchen appliances herein shown as a food mixer 12, a blender 13, a meat grinder 14, a meat slicer 15, and a can opener 16.

The base 10 has a centrally recessed platform 17 surrounded by an annular upstanding wall 18 the inner periphery of which is lined with a metal band 19 and the top covered by an annular metal plate 20 which projects beyond the wall 18 to form with the base a marginal recess 21 in which the turntable 11 is rotatably mounted. An electric motor 9 and motor cooling fan 22 are supported as a unit on the platform 17 by brackets 23 and 24. A housing 25 encloses the motor-fan unit and is attached by brackets 26 to the top wall 20 of the base 10. A cover 27 is provided for access to the motor-fan unit and is removably attached by spring clips 28 to the side wall 29 of the housing.

One end 30 of the armature shaft extends beyond the fan housing and rigidly secured thereto is a disc-shaped clutch member 31 having a convex face 32 at its outer end which projects through an opening 33 in the housing wall 29. A pair of holes 34 arranged diametrically of the clutch member 31 extend through the latter and terminate at the face 32 in a reduced portion 35. Slidably arranged in each hole 34 is a pin 36 having a projection 37 at its outer end disposed in an elongated slot 38 of a bell crank lever 39, one end of which is pivotally secured at 40 to a tang 41 on the clutch member 31 and the opposite end is provided with a weighted ball 42. A spring 43 is arranged about each pin 36 in the holes 34 and urges each pin 36 outwardly, and such movement of the pins is limited by the weighted balls 42 resting on the shaft 30 when the latter is stationary.

Each of the appliances on the turntable 11 has a shaft 45 provided at its end with a clutch member 46 having a concave surface 47 and two diametrically arranged openings 48 adapted to be aligned with the holes 34 in the clutch member 31. When the motor shaft 30 is rotated the balls 42 move away from the shaft under the influence of centrifugal force to pivot the levers 39 and move the pins 36 through the holes 35 into the openings 48 of the clutch member 46 to form a driving connection with the shaft 30 and operate the particular appliance on the turntable aligned with the clutch member 31.

The turntable 11 has an inner peripheral portion 50 rotatably mounted in the marginal recess 21 of the base 10. Bearing surfaces for rotatably supporting the turntable include an annular plate 51, a ring 52 mounted on the base 10, and a band 53 adjacent the outer surface 54 of the wall 18 on the base. The bearing surfaces may be of metal or other suitable material. A port 55 is provided in the band 53 for each appliance on the turntable and is arranged vertically below its shaft 45.

A turntable locking bar 56 is slidably supported in a bracket 57 attached to the platform 17 and a metal sleeve 58 in the projecting base wall 18, and the end 59 of the bar 56 is adapted to pass through the port 55 in the band 53 when the clutch member 46 of each appliance on the turntable 11 is in alignment with the clutch member 31 on the motor shaft to thereby lock the turntable with respect to the motor. A spring 60 is arranged between the bracket 57 and a collar 61 on the bar 56 to normally bias the end 59 of the bar into its turntable locking position as shown in dotted lines in Fig. 2.

In order to manually control the locking bar 56 a lever 62 is pivoted about a washer 63 secured by a bolt 64 to a post 65 supported on the platform 17. One end 66 of the lever has an elongated slot 67 receiving a projection 68 on the bar 56, the opposite end 69 of the lever extends through a slot 70 in the housing side wall 29 for manipulation by the operator. Counterclockwise movement of the lever 62, as viewed in Fig. 1, shifts the bar 56 out of the ports 55 to permit free rotation of the turntable. The slot 70 is provided with a suitable marginal recess 71 to hold the lever 62 and bar 56 in unlocked position against the force of the spring 60.

Attached to the armature shaft adjacent the end of the motor 9 is a governor 74 having bowed leaf springs 75 and 76 secured together at their opposite ends by rivets provided with weights 77 which under the influence of centrifugal force shift the leaf spring 76 toward the spring 75. Extending from the motor is a bracket 78 to which a pair of spaced spring switch arms 79 and 80 are attached by a nut and bolt 81. The switch arms 79 and 80 are provided with contacts 82 and 83, respectively, and are insulated from each other at 84, and have unshown means for connection to the source of current. The switch arm 80 is biased toward the governor leaf spring 76 and rests against an insulating button 85 on the spring 76 to move with the latter when displaced by centrifugal force. The switch arm 79 is also biased to move toward the switch arm 80 to connect the contacts 82—83 with the source of current. Attached to the end 86 of the bar 56 by a collar 87 is a member 88 which frictionally engages the free end 89 of the switch arm 79. Movement of the bar 56 to the left and right, as viewed in Fig. 2, controls the "on" and "off" positions of the contacts 82—83. A fan 90 is attached to the armature shaft adjacent the governor 74 to cool the contacts 82—83 and reduce the heat caused by the button 85 rotating against the switch arm 80. A switch 91 is mounted on the housing wall 29 to close the circuit to the contacts 82 and 83.

Each of the appliances 13, 14, 15 and 16, with the exception of the food mixer 12, is provided with a device to preset the optimum speed for its operation and comprises a threaded sleeve 92 mounted in an opening 93 in the inner portion of the turntable vertically below the shaft 45 of the appliances 13, 14, 15 and 16. Threaded in each sleeve 92 is a plug 94 having an end 95 against which the end 59 of the bar 56 abuts, and the opposite end of the plug has a polygonal recess 96 for adjusting the plug 94 with respect to the end 59 of the bar 56 to preset the speed of operation of the particular appliance. Access to the recess 93 is provided through a port 97 covered by a removable plate 98 for inserting a tool to adjust the position of the plug.

When either of the appliances is aligned with the bar 56 the spring 69 moves the end 59 of the bar into engagement with the end 95 of the plug 94. As the bar 56 enters each sleeve 92 the force exerted by the member 88 on the end of the spring arm 79 is altered to preset the position of the contact 82 to determine the speed at which the governor 74 will separate the contact 83 from the contact 82 to interrupt the circuit to the motor and thereby prevent excessive speeds in operating each appliance. The appliances 13, 14, 15 and 16 each operate at different speeds but such speeds are constant and accordingly the plug 94 can be adjusted at the factory to provide the proper maximum speed of operation for each appliance.

Figure 2:
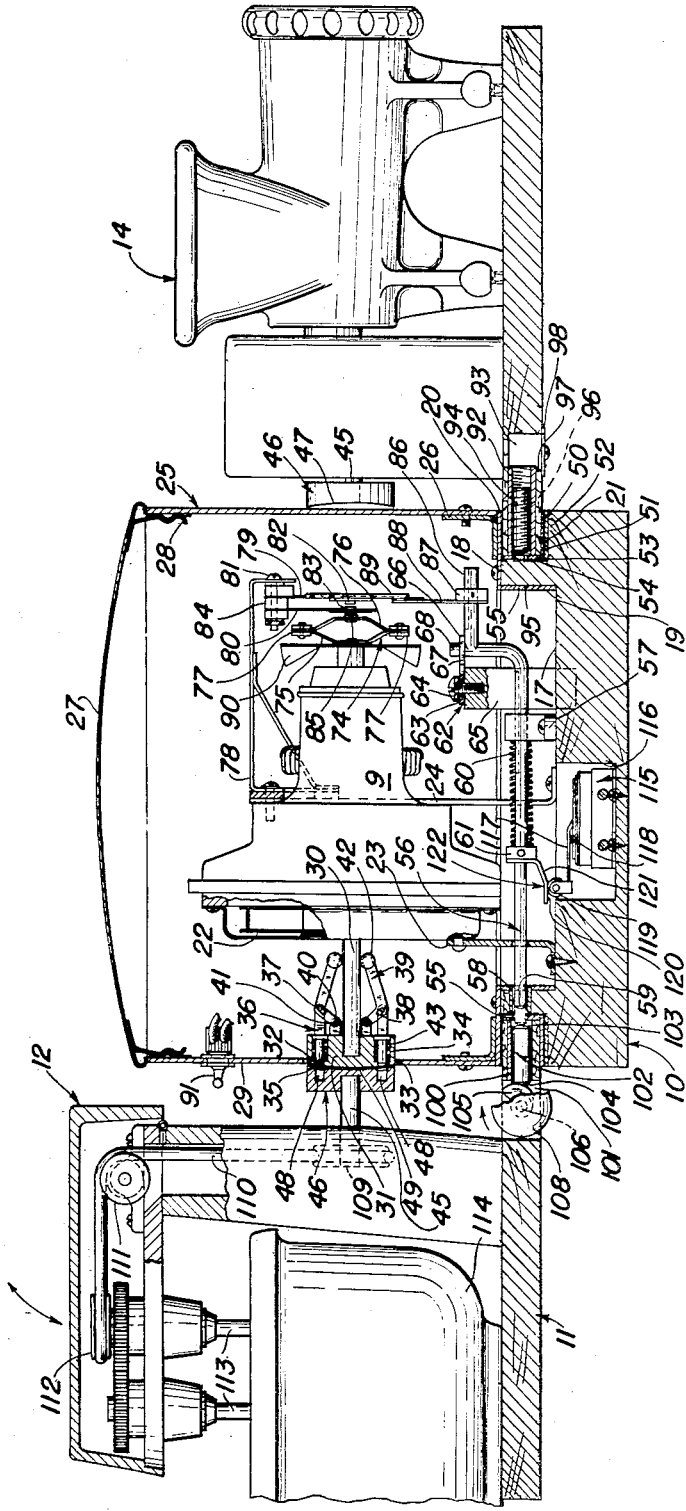
Fig. 2 is a section along the line 2—2 of Fig. 1.

The food mixer 12 must be operated at different speeds and accordingly a variable speed control is provided. It includes a sleeve 100 in the turntable 11 exposed at one end to the port 55 and its opposite end communicates with an opening 101 in the turntable 11. Slidable in the sleeve 100 is a plunger 102 having one end 103 adapted to engage the bar 56 and the opposite end 104 projecting into the opening 101. Disposed in the opening 101 is a cam 105 mounted on a shaft 106 rotatably recessed in the turntable 11 by a bracket 107 and terminating in an adjusting knob 108. Rotation of the knob 108 in a clockwise direction, as indicated in Fig 2, displaces the plunger 102 in the sleeve 100 to vary the distance of the end 103 of the plunger 102 with respect to the port 55 and thus the distance that the bar 56 will enter the sleeve 100 to adjust the contact 82 and thereby vary the speed of operating the mixer 12. Attached to the shaft 45 of the food mixer 12 is a pulley 109 having a belt 110 which travels over a pair of idler puleys 111 and a pulley 112 which drives the beaters 113 in the bowl 114.

In order to automatically interrupt the electric circuit to the motor 9 while the turntable 11 is being rotated to connect the different appliances to the motor shaft 30, a microswitch 115 of conventional construction is provided. The switch 115 is mounted in a recess 116 below the bar 56 and has an upwardly biased leaf spring 117 and an operating circuit controlling pin 118 which engages the under surface of the spring 117. Rotatably mounted at the free end of the spring 117 is a roller 119 which engages the portions 120 and 121 of an angle member 122 rigidly attached to the collar 61. When the bar 56 is shifted by the lever 62 to its unlocked position shown in full lines in Fig. 2 the portion 120 depresses the roller 119 and the spring 117 to move the switch pin 118 downwardly and break the circuit through the switch 115 to prevent operation of the motor 9. Movement of the lever 62 to "on" position shifts the bar 56 to the left and the roller 119 rides along the inclined portion 121 to permit the spring 117 and pin 118 to move upwardly to close the contacts in the switch 115 and connect the motor in the power circuit.

Figure 4:
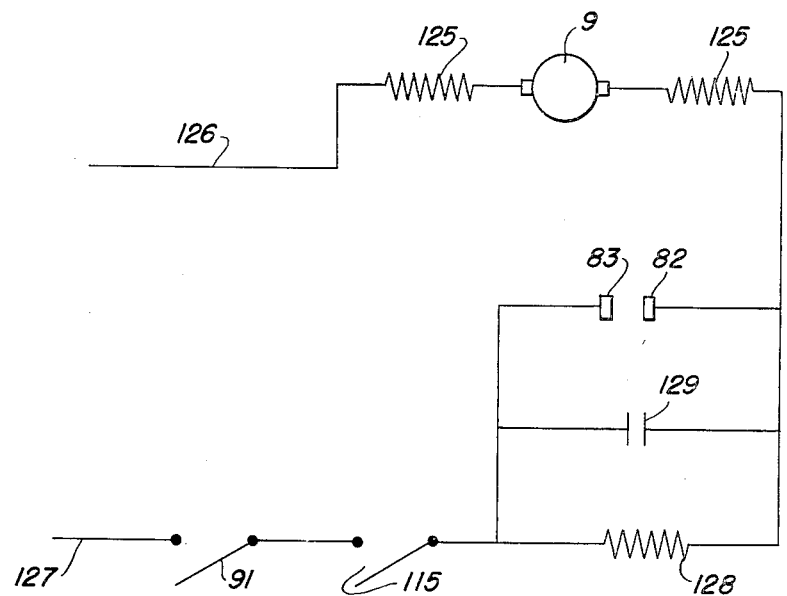
Fig. 4 is a wiring diagram.
Figure 3:
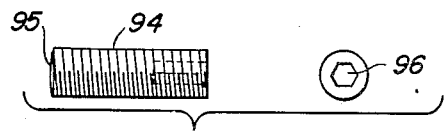
Fig. 3 is side and end views of a speed adjusting plug.

The power circuit shown in Fig. 4 includes the motor 9 having its series field 125 connected to one line 126 of the source of current and to the governor controlled switch contacts 82 and 83, the latter being connected to the microswitch 115 which in turn is joined to the operating switch 91 connected to the other line 127 of the current source. A speed controlling resistor 128 is connected across the governor contacts 82—83, and also a capacitor 129, the latter reducing sparking at the governor contacts 82—83. When the contacts 82—83 are engaged and the switches 91 and 115 closed, the motor 9 is energized and when it arrives at the preset speed determined by the food mixer cam 105, or the speed setting plugs 94 for the other appliances, the contacts 82—83 are opened and the resistance 128 inserted in series with the motor 9 to limit the voltage applied thereto so that the motor speed is reduced, and as soon as the speed falls below the preset speed the contacts 82—83 close, thereby short-circuiting the resistance 128 and the motor again increases in speed. The closing and opening of the contacts 82—83 is rapid so that the motor constantly operates at the preset speed required for each appliance.

When the device is not in use the switch 91 is opened to interrupt the circuit to the contacts 82—83 and the lever 62 is in its released position to hold the rod 56 to the right, as viewed in Fig. 2, to thereby separate the contacts 82—83 and also permit free rotation of the turntable 11. Movement of the bar 56 to its turntable release position also causes the member 122 to depress the leaf spring 117 and pin 118 to open the switch 115 and thus interrupt the power circuit so that if the switch 91 has been accidentally closed the circuit to the motor is not completed while the turntable is in its unlocked position.

If it is desired to use the food mixer 12, the turntable 11 is rotated to align its clutch member 46 with the driving clutch member 31 and thereafter the lever 62 is moved clockwise, as viewed in Fig. 1, to displace the bar 56 so that its end 59 passes through the port 55 into the sleeve 100 and engages the end 103 of plug 102 as shown in dotted lines in Fig. 2. When the bar 56 is in the sleeve 100 it aligns the mixer clutch member 46 with the motor clutch member 31 and locks the turntable for connection of the clutch members 31—46.

The knob 108 is rotated to adjust the cam 105 and the plug 102 to position the bar 56 to the speed required for mixing the material in the bowl 114. Suitable indicia is provided on the turntable 11 and the knob 108 to indicate the different speeds. Movement of the rod 56 against the end 103 of the plug 102 causes the cam surface 120 to ride off the roller 119 on the leaf spring 117 permitting the latter and the pin 118 to move upwardly to close the switch 115. When the bar 56 enters the sleeve 100 the member 88 is also displaced to permit the spring switch arm 79 to move the contact 82 into engagement with the contact 83. Thereafter, the switch 91 is closed to complete the power circuit, causing the armature to rotate and the weights 42 on the bell crank levers 39 will be subjected to centrifugal force and move the pins 36 into the openings 48 of the clutch member 46 to drive the latter and thus the beater 113.

When the motor speed becomes greater than that set by the knob 108 the weights 77 on the governor 74 displace the leaf spring 76 toward the spring 75 causing the contact 83 to be separated from the contact 82, at which time the resistance 128 is inserted in series with the motor 9 so that the motor speed is reduced, and when the speed is below that selected the leaf spring 76 again urges the contact 83 into engagement with the contact 82 to again increase the motor speed. This action is very rapid so that the motor operates at substantially the speed selected by the knob 108. To terminate the mixing operation the switch 91 is opened to de-energize the motor 9 whereby the bell crank levers 39 are no longer subjected to centrifugal force and permit the springs 43 to move the pins 36 out of the openings 48 in the clutch member 46 to disengage the latter from the motor shaft 30. Thereafter the lever 62 is shifted to its release position causing the bar 56 to be moved out of the sleeve 100 and unlock the turntable 11 for free rotation.

The blender 13, meat grinder 14, slicer 15 and can opener 16 are operated at constant speeds and such speed is set at the factory by adjusting the plug 94 for each appliance. When either of these appliances are used, the turntable 11 is rotated to align its clutch member 46 with the drive shaft clutch member 31 and then the lever 62 is moved clockwise as viewed in Fig. 1 to displace the bar 56 into the sleeve 92 to thereby lock the turntable. The end 59 of the rod 56 engages the end 95 of the plug 94 to set the maximum speed for each appliance and the greater the distance that the bar 56 enters the sleeve 92 the higher the maximum speed. Movement of the rod 56 into the sleeve 92 also adjusts the contacts 82—83 to preset the maximum speed at which these contacts will be separated to cut the resistance 128 in and out of the circuit to maintain a substantially uniform speed for each appliance. The driving pins 36 in the clutch member 31 will be displaced into the ports 48 of each appliance to drive the latter in the same manner as for the food mixer.

While but a single embodiment of the invention has been described and shown, it is to be understood that this embodiment is to be taken as illustrative only and not in a limiting sense. I do not wish to be limited to the particular structure shown and described but to include all equivalent variations except as limited by the scope of the claims.

I claim:

1. A domestic kitchen device comprising: an electric motor having driving means, a plurality of kitchen appliances, means on each of said appliances adapted to be separately connected with said driving means to operate said appliances, a centrifugally operated switch attached to said motor, and means for each of said appliances connectible with said centrifugal switch to control the operation of the latter.

2. A domestic kitchen device comprising: an electric motor, a plurality of kitchen appliances adapted to be separately operated by said motor, locking means engageable with each appliance to position each appliance for connection with said motor, and means including said locking means to control the speed of said motor and thus of each appliance.

3. A domestic kitchen device comprising: an electric motor, a plurality of kitchen appliances adapted to be separately connected to said electric motor, locking means engageable with each appliance to position each appliance for connection with said motor, and means actuated by said locking means when in release position to disconnect the current to said motor.

4. A domestic kitchen device comprising: a stationary electric motor, an annular support mounted for rotation around said motor, a plurality of kitchen appliances on said support for movement therewith relative to said motor, means on each of said appliances adapted to be connected to said motor, means engageable with said support for selectively locking each of said appliances for said connection with said motor, and means controlling the speed of operation of each of said appliances.

5. A domestic kitchen device as described in claim 4, and means actuated by said locking means when in release position to disconnect the current to said motor.

6. A domestic kitchen device comprising: an electric motor, an annular support mounted for rotation about said motor, a plurality of kitchen appliances on said support for movement therewith relative to said motor, and drive means on said motor adapted to be connected with each kitchen appliance to operate the latter, and said drive means including centrifugal means actuated by said motor to make driving connection with each kitchen appliance.

7. A domestic kitchen device comprising: a stationary electric motor, an annular support mounted for rotation about said motor, a plurality of kitchen appliances on said support for movement therewith relative to said motor, means on each appliance adapted to be connected to said motor to operate said appliances, and means for each appliance arranged partially on said annular support to control the speed of operation of the connected appliance.

8. A domestic kitchen device comprising: a stationary electric motor, an annular support mounted for rotation about said motor, a plurality of kitchen appliances on said support for movement therewith relative to said motor, means on each appliance adapted to be connected to said motor to operate said appliances, means for setting the speed of operation of each appliance, and means for varying the speed of one of said appliances.

References Cited in the file of this patent

UNITED STATES PATENTS

| | | |
|---|---|---|
| 1,879,004 | Altorfer | Sept. 27, 1932 |
| 2,084,234 | Anderson et al. | June 15, 1937 |
| 2,567,127 | Shoffner | Sept. 4, 1951 |
| 2,603,975 | Shoffner | July 22, 1952 |